2,616,178

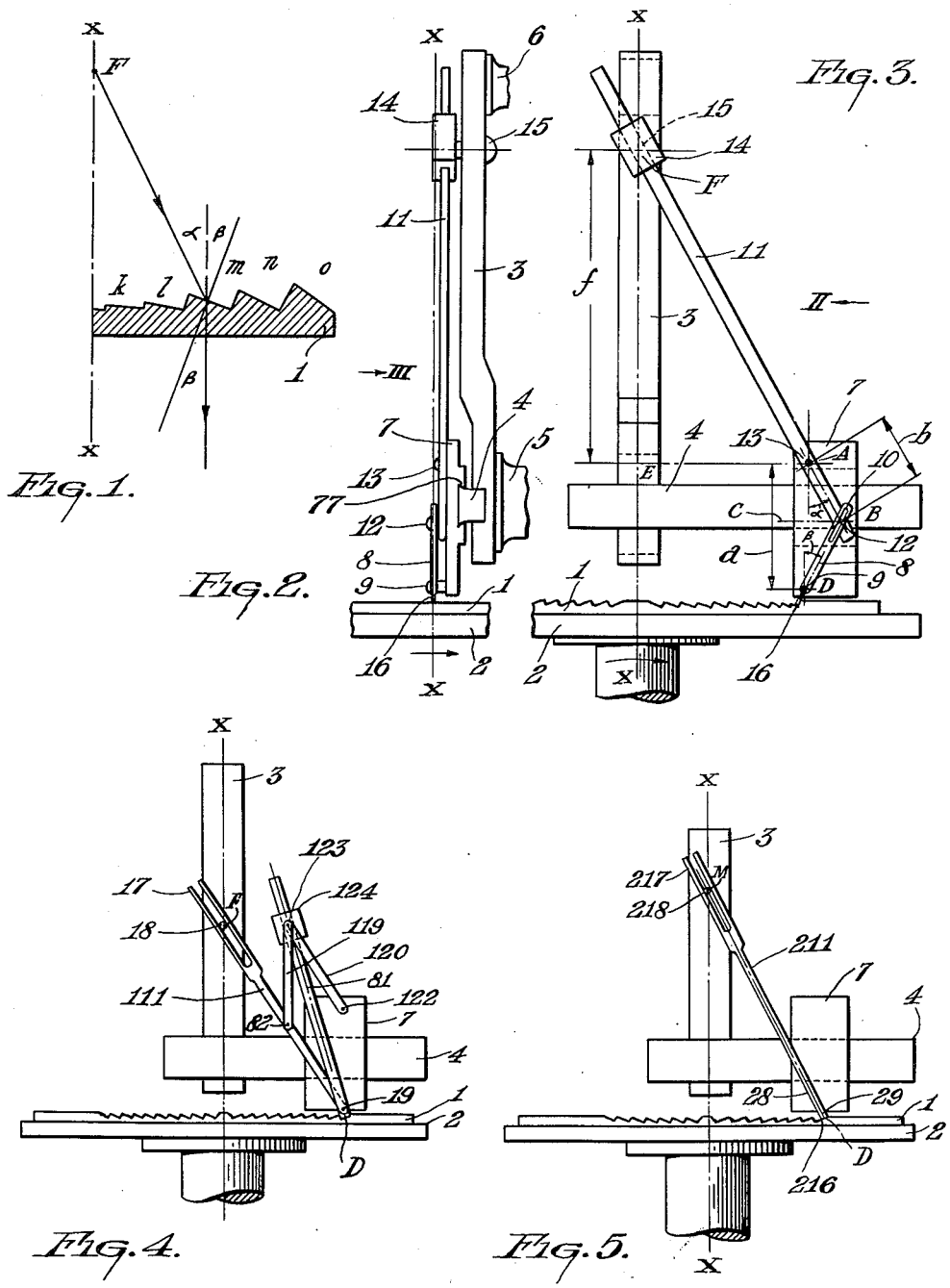
Nov. 4, 1952 — G. J. SIEZEN — 2,616,178
DEVICE FOR MANUFACTURING FRESNEL SURFACES
Filed May 7, 1948 — 2 SHEETS—SHEET 1
INVENTOR.
GERRIT JAN SIEZEN
BY
*E. F. Wenderoth*
ATTORNEY

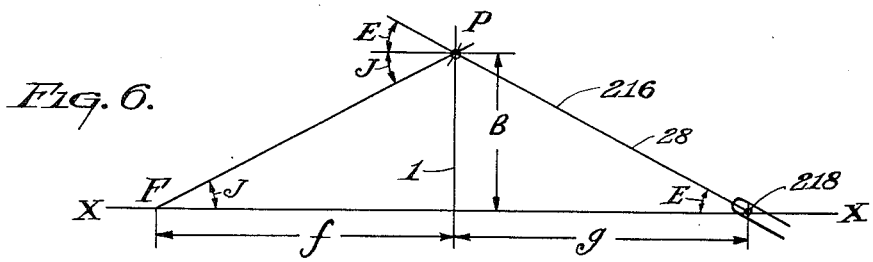
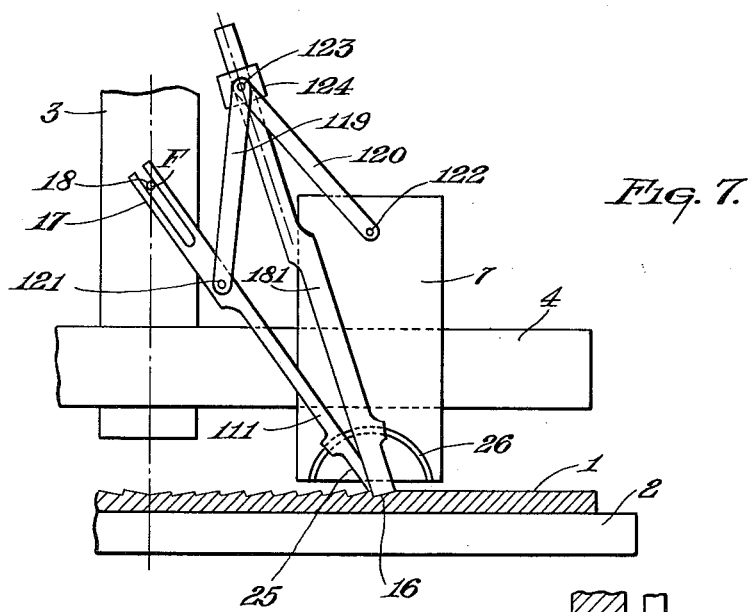
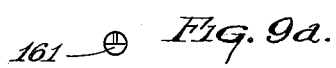
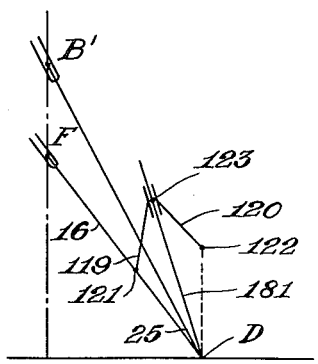
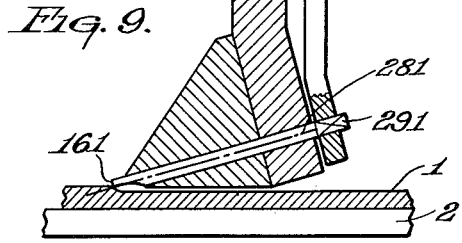
INVENTOR.
GERRIT JAN SIEZEN
BY E. F. Wenderoth
ATTORNEY Patented Nov. 4, 1952

UNITED STATES PATENT OFFICE 2,616,178

DEVICE FOR MANUFACTURING FRESNEL SURFACES

Gerrit Jan Siezen, Eindhoven, Netherlands, assignor to Hartford National Bank and Trust Company, Hartford, Conn., as trustee Application May 7, 1948, Serial No. 25,735
In the Netherlands June 18, 1947

8 Claims. (Cl. 33—18)

In several optical devices use is made of objects which exhibit the optical properties of a convex or concave lens or mirror but which exhibit a substantially smooth surface provided with grooves or ribs instead of the spherical or concave surface corresponding to the action of such a lens or mirror. The surfaces of the grooves or ribs may in each instance be distinguished by both an optically active portion which refracts or reflects the light rays in a manner similar to that done by concave or convex lenses or mirrors, and in an optically inactive portion constituting the transition to the said optically active portion of the surface of the adjacent groove or rib. Such surfaces are termed "Fresnel surfaces." They may be distinguished, for example, by convex, parabolic or similar surfaces, according to the shape of the curved surface exhibiting the same optical properties. In most cases the said surfaces exhibit rotational symmetry and the grooves will be of circular or substantially circular shape. However, as an alternative, the grooves may be parallel to one another and rectilinear, in which event the Fresnel surface exhibits the optical action of a cylindrical lens or a cylindrical mirror.

In the first-mentioned case the grooves exhibit one optical axis and in the last-mentioned case there is an infinite number of optical axes, the arithmetical position of which is a plane. The shape of the grooves regularly varies as a function of the distance between a groove and optical axis in the first case, and as a function of the distance between a groove and the said plane in the second case.

Such surfaces may be provided either on transparent material, in which event a Fresnel lens is obtained, or on reflecting material. Such surfaces may be used inter alia in projection screens, both of the opaque and transparent varieties.

The present invention relates to a device for manufacturing such surfaces. A tool for altering the surface of an optical object, for example a chisel, is moved along the surface to be altered whereby grooves are formed therein. The shape of the grooves is made to regularly vary as a function of the distance between the given groove and the optical axis extending in a plane at right angles to the Fresnel surface and to the direction of the groove at the area of surface alteration, since the position of the tool is controllable.

It is already known (in U. S. Patent No. 2,279,555 to Browne et al. for "Optical Image Producing and Viewing Arrangement," for example) to cause the surface altering tool, in the present instance a chisel, to perform a circular movement along the surface and to control the position of the tool by means of a lever having secured to it a segment of particular shape over which a cord is led. This cord is moved in accordance with the spacing of the tool and the optical axis, that is the axis of the circular movement.

In this known device the shape of the segment is required to be determined empirically, which is difficult to perform with accuracy. Furthermore it is necessary that in each instance a different segment should be utilised for cutting Fresnel surfaces having different optical constants, for example different focal lengths.

The said disadvantages do not occur when the present invention is used.

According to the invention, the tool forms part of an articulated rod system; such system comprises at least one rod which has a length between two pivot points thereof and a position which corresponds to that of at least one main ray from that part of the optical surface which is under the tool.

With regard to the aforesaid position of such a rod, according to the invention, said rod always has the same direction as that of such a main ray, but does not always occupy exactly the same position thereof. More specifically, the rod may be displaced a certain distance with respect to the main ray but parallel thereto.

The term "main ray" is to be understood, as usual, to mean a light ray either parallel to the optical axis, passing through the focus, or through the centre of curvature of the optical element.

There is no need for the length of such a rod between the pivots to be constant, since a pivot may be arranged to be slidable on the rod.

The invention and some embodiments thereof will now be explained more fully by reference to examples clarified by figures.

In each example a chisel is used as the surface altering tool, since in this manner the figures may be simplest. However, it is evident that the invention also comprises the use of other tools for deforming or removing material, such as grinding discs, rollers, polishing irons and the like. The choice of the tool is substantially dependent on the kind of material on which the Fresnel surface is required to be provided.

Figure 1 illustrates the refraction of a light ray in a Fresnel lens.

Fig. 2 is an end elevational view of one form of the device according to the invention for cut- Fig. 3 is an elevational front view of the device shown in Fig. 2.

Fig. 4 is an elevational front view of another form of the invention for cutting so-called parabolic Fresnel surfaces.

Fig. 5 is a front elevational view of still another form of the invention for cutting so-called concave spherical Fresnel surfaces.

Fig. 6 is a diagrammatic representation showing the refraction of a light ray in a spherical lens, and Fig. 7 is a front elevational view of another form of the invention similar in most respects to that shown in Fig. 4 but comprising additional means for guiding the chisel for cutting the grooves.

Fig. 8 illustrates diagrammatically the operation of a further modification of the device of Fig. 4.

Fig. 9 shows a modification of the construction of Fig. 7 for supporting and guiding the chisel end.

Fig. 9a is an end elevation view of the chisel shown in Fig. 9.

All the devices shown are intended for cutting Fresnel surfaces exhibiting rotational symmetry, in which event the object on which such a surface must be provided is turned. However, it is alternatively possible in a similar manner to manufacture Fresnel surfaces of cylindrical shape, in which event the grooves are rectilinear and the table is required to perform a reciprocating movement.

Referring first to Fig. 1, reference numeral 1 indicates a section of the part of a convex surface Fresnel lens which is located at one side of the axis X—X, which lens comprises the zones $k$, $l$, $m$, $n$ and $o$ and has its focus at F.

A light ray passing through F, which makes an angle $\alpha$ with the axis X—X of the lens, impinges on the surface of the zone $m$ and is refracted and emerges from the lens in a direction parallel to the axis X—X. The angle enclosed by the perpendicular on the refracting surface and the axis X—X is indicated $\beta$.

According to the law of Snell $$\frac{\sin(\alpha+\beta)}{\sin \beta}=n$$

$n$ being the refractive index of the material constituting the lens.

From this follows that $$\tan \beta = \frac{\sin \alpha}{n - \cos \alpha}$$

The invention encompasses a device for manufacturing such convex surface Fresnel lenses, by usage of a surface-altering tool which is moved accurately by a rod system such that the abovementioned condition is fulfilled.

The said device (Figs. 2 and 3) may comprise a table 2, which is rotatable about the axis X—X and to which the plate 1 is secured which will be provided with the spherical Fresnel surface. The plate may be of highly-transparent artificial resin, for example polystyrene or polymethacrylacid methylester, so-called "Plexiglas," a chisel being used as a surface-altering tool. As an alternative, the plate may be of a different, opaque material, of which prints of transparent material may be manufactured in a known manner.

Over the table 2 is a support comprising parts 3 and 4 and supported at 5 and 6. A slider 7 having a groove 77 therein, is slidably mounted on the part 4 in a manner which is indicated in Fig. 2. The slider 7 is adapted to be displaced along part 4, by means of a screw or a piston rod, for example, neither of which are shown.

It is evident that, whenever reference is made to a rotary table, this is to be understood that the table can rotate with respect to the support and the parts secured thereto. Contrariwise, the table may be fixed and the support rotatable.

The chisel 8 is pivoted on spindle 9 close to the cutting extremity of the chisel. The cutting surface 16 of the chisel is at right angles to the line BD. The other extremity of the chisel 8 exhibits a slot 10 in which can slide a pin 12 secured to the extremity of a guide rod 11, which is pivoted on a spindle 13 secured to the slider 7 perpendicularly above the spindle 9. The line AD drawn from the pivot 13 of the guide rod 11 to the pivot 9 of the chisel 8 is thus parallel to the axis X—X. The other extremity of the guide rod 11 is slidable in a block 14 which is pivoted on a spindle 15 intersecting the axis of rotation X—X, of the disc 2.

As shown in Fig. 3, the geometrical axes corresponding to the parts 13, 12, 9, 14 are in addition provided with letters A, B, D and F, respectively, for use in the geometrical deduction of the operation of the said device given hereinbelow.

In Fig. 3 it is indicated that $AD=a$, $AB=b$, and $EF=f$. As before, the angle $\alpha$ represents the angle enclosed by a light ray passing through the focus and the axis of rotation X—X, $\beta$ representing the angle made by the axis X—X and the perpendicular on a part of the Fresnel surface which in this case is also the direction of the chisel.

Now we have that $$AC = b \cos \alpha$$

hence $$CD = a - b \cos \alpha$$

and $$BC = b \sin \alpha$$

from which follows that $$\tan \beta = \frac{BC}{CD} = \frac{\sin \alpha}{\frac{a}{b} - \cos \alpha}$$

Comparing this formula with that for the lens shown in Fig. 1, it appears that, when it ensured that $$\frac{a}{b} = n$$

the surface of a transparent plate, cut by the described device and having a refractive index $n$, will be active as a convex Fresnel lens refracting the light rays passing through F, in parallel with the axis X—X. Consequently, in this case, the length of the guide rod 11 between the pivots 13 and 14 and the angular position thereof correspond to those of a main ray passing through F. The location of the rod is different, however, since it has been displaced through a distance $a$ in the axial direction as indicated in Fig. 3.

Cutting a reflecting parabolic Fresnel surface will now be described as a second example with reference to Fig. 4 wherein a device therefor is shown. Such a surface reflects through one point all the light rays which are parallel to the axis X—X and incident on said surface.

As before, the device comprises a table 2, which is rotatable about the axis X—X, and a fixed support constituted by the parts 3 and 4. The chisel 81, which is pivoted on spindle 19, is secured to the slider 7. The chisel 81 is controlled by a parallelogram of rods comprising a guide rod 111, of which one extremity is pivoted at 19, whereas the other extremity is shaped as indicated at 17 and is slidable on a pin 18 positioned in the axis X—X. The parallelogram further comprises two rods 119 and 120 of equal length, the lower extremities of which are secured to pivots 82 and 122, provided on the rod 111 and the slider 7, respectively. The point 122 is perpendicularly above the spindle 19 and the distance between points 122 and 19 comprises another side of the parallelogram. The upper extremities of the rods 119 and 120 are secured, by means of a spindle 123, to a sleeve 124 which can slide over the extremity of the chisel 81. By means of this device it is ensured that the perpendicular to the operative surface of the chisel invariably divides into halves the angle made by the light rays incident parallel to the axis X—X and the rays passing through the focus F, which coincides with the pin 18. For this purpose the points 82 and 122 are equidistant from the spindle 19.

In the above device, the length between the pivots 18 and 19 of the guide rod 111 and, in this case, the position thereof both correspond to a main ray passing through F.

Similarly, it is possible to cut a Fresnel mirror of spherical shape as shown in Fig. 5. In this case, the chisel 28, which as before is pivoted on a spindle 29 secured to the slider 7, may constitute and integral assembly with the guide rod 211, which exhibits a bifurcated portion 217 and which is adapted to slide on the pin 218. The centre of curvature M of the mirror cut in this way lies on the axis X—X.

With the same device as shown in Fig. 5, manufacturing a matrix for a convex Fresnel lens is also possible. However, the accuracy of such a manufactured lens is smaller than that of a lens manufactured with the aid of the device shown in Figs. 2 and 3.

This will be shown by a calculation made clear by Fig. 6. It is assumed that by means of a guide rod 216, which also constitutes the chisel 28 (shown diagrammatically) and which is adapted to slide and turn about a pin 218, it is desired to cut a surface element P such that a light ray coming from F, after being refracted, will emerge in parallel with the axis. Now, the question arises what is the distance $g$ between the pin 218 and the plate 1 in order to ensure this result?

For this ray we have:

$$\sin (E+J) = n \sin E$$

Assuming that the angles are small, we may write $$E + J = nE$$

and furthermore $$J \approx \frac{B}{f} \text{ and } E \approx \frac{B}{g}$$

in which B represents the distance between the part P and the axis X—X. From this follows $$\frac{B}{g} + \frac{B}{f} = n\frac{B}{g}$$

or $$g = f(n-1)$$

Consequently, if here the distance between the pins 218 and the Fresnel surface is chosen in this way, the surface of a convex Fresnel lens will be approximately obtained. However, this surface is not cut directly into a transparent plate, since the surface obtained constitutes as it were the negative of the surface desired. Consequently, the material of the original plate is required to be such as to be serviceable for a matrix. The casts of such a matrix in transparent material then show the properties desired.

The matrix may, for example, be manufactured from a metal, such as bronze, or from wax. The casts may be made in a manner as known in the manufacture of records.

In order to avoid the loss of light which may arise in such mirrors and lenses at the upright edges of the grooves, it is possible to utilise a chisel or other deforming tool constituted by two parts, of which one intersects the optically active surface and hence the refractive or reflecting surface, and the other intersects upright edges, of which the axial sections lie on lines leading to one point on the axis, above the Fresnel surface. As a rule, this point will be the image point, that is to say the focus in the case of lenses or mirrors for light rays parallel to the axes of such lenses or curves, respectively.

An example of a device thus constructed is shown diagrammatically in Fig. 7. It is substantially identical with the device intended for cutting parabolic mirrors as shown in Fig. 4, but here the side of the guide rod 111 is also shaped in the form of a chisel at 25. This cutting surface lies in the line passing through the centre of rotation of the chisel 181 and the focus F. This kind of mirror is intended for infinite distances of the object.

If the mirror is intended for finite distances of the object, the guide rod 111 controlled by the pin 18 remains in the focus, but in this case it is necessary to provide chisel 25 as a second rod (Fig. 8), which is pivoted at D and which passes through the image point B' on the axis X—X, which instead of coinciding with F, now lies higher above the Fresnel surface.

In such devices the accuracy of the result requires the point D (the spindle 9) to be as close as possible to or preferably in the Fresnel surface. In the device shown in Fig. 7 this is ensured in that the guide rod 111 and the chisel 181 are adapted to turn on a cylindrical part 26, of which the axis D lies under the slider 7, in the Fresnel surface.

The construction, of which a detail is shown in Fig. 9, has a greater stability. In this construction the spindle 291 of the deforming tool, in this case again a chisel 281, makes an acute angle with the surface of the table 2 and passes through the cutting surface 161 of the chisel. The chisel 281 is integral with a rod 8a which is controlled in the manner above described. In this device the distance between the cutting surface and the table is constant. Fig. 9a is a separate end elevation view of the chisel as seen from the left in Fig. 9.

The various Fresnel surfaces manufactured in the manner as above described may be provided either on the optical element itself and hence, for example, on a transparent plate or on material which is reflecting by nature or may be made reflecting as already indicated hereinbefore. As a matter of course, it is also possible to manufacture the surfaces on an object intended as a matrix, of which afterwards prints or casts may be produced in different ways. For this purpose use may be made of the method known in the manufacture of records. The foregoing has likewise been indicated hereinbefore.

What I claim is:

1. A device for forming Fresnel surfaces, comprising; a table adapted to support an object in which the Fresnel surface is to be formed, a support detached from said table but operatively associated therewith, a slider movably mounted on said support, a surface-altering tool pivotally mounted on said slider for movement therewith, and means for regularly varying the pivotal position of said surface-altering tool with respect to said table in accordance with the position of said slider on said support, said means comprising at least one rod pivoted at two points therealong and having the same direction as at least one main ray of the Fresnel surface manufactured, said ray extending from the operative edge of said surface-altering tool, said two points being spaced apart a distance equal to the distance from the optical axis of the Fresnel surface to the surface under the tool measured along the main ray.

2. A device for forming Fresnel surfaces, comprising; a table adapted to support an object in which the Fresnel surface is to be formed, a support detached from said table but operatively associated therewith, a slider movably mounted on said support, a surface-altering tool pivotally mounted on said slider for movement therewith, and articulated rod means for regularly varying the pivotal position of said surface-altering tool with respect to said table in accordance with the position of said slider on said support, said means comprising at least one rod pivoted at two points therealong and having the same direction as at least one main ray of the Fresnel surface manufactured, said ray extending from the operative edge of said surface-altering tool, said two points being spaced apart a distance equal to the distance from the optical axis of the Fresnel surface to the surface under the tool measured along the main ray, said pivot for said surface-altering tool being located thereon closely adjacent said operative edge thereof, one of said two pivot points for said rod being mounted on said slider and the other of said two pivot points being located in the optical axis of the Fresnel surface.

3. A device for forming Fresnel surfaces, comprising; a table adapted to support an object in which the Fresnel surface is to be formed, a support detached from said table but operatively associated therewith, a slider movably mounted on said support, a surface-altering tool pivotally mounted on said slider for movement therewith, and articulated rod means for regularly varying the pivotal position of said surface-altering tool with respect to said table in accordance with the position of said slider on said support, said means comprising at least one rod pivoted at two points therealong and having the same direction as at least one main ray of the Fresnel surface manufactured, said ray extending from the operative edge of said surface-altering tool, said two points being spaced apart a distance equal to the distance from the optical axis of the Fresnel surface to the surface under the tool measured along the main ray, said pivot for said surface-altering tool being located thereon closely adjacent said operative edge thereof, one of said two pivot points for said rod being mounted on said slider and the other of said two pivot points being located in the optical axis of the Fresnel surface, said rod pivot point mounted on said slider and said tool pivot point mounted on said slider being in a line normal to the surface of said table, said rod having an extension connected to said tool for controlling the position thereof.

4. A device for forming Fresnel surfaces, comprising; a table adapted to support an object in which the Fresnel surface is to be formed, a support detached from said table but operatively associated therewith, a slider movably mounted on said support, a surface-altering tool pivotally mounted on said slider for movement therewith, and articulated rod means for regularly varying the pivotal position of said surface-altering tool with respect to said table in accordance with the position of said slider on said support, said means comprising at least one rod pivoted at two points therealong and having the same direction as at least one main ray of the Fresnel surface manufactured, said ray extending from the operative edge of said surface-altering tool, said two points being spaced apart a distance equal to the distance from the optical axis of the Fresnel surface to the surface under the tool measured along the main ray, said pivot for said surface-altering tool being located thereon closely adjacent said operative edge thereof, one of said two pivot points for said rod being mounted on said slider and the other of said two pivot points being located in the optical axis of the Fresnel surface, said rod pivot point and said tool pivot point coinciding, and means mounted on said slider assuring that said operative surface of said tool is always at right angles to the line which divides into halves the angle formed between said rod and the perpendicular on the surface of said table in the area of said tool.

5. A device for forming Fresnel surfaces, comprising; a table adapted to support an object in which the Fresnel surface is to be formed, a support detached from said table but operatively associated therewith, a slider movably mounted on said support, a surface-altering tool pivotally mounted on said slider for movement therewith, and articulated rod means for regularly varying the pivotal position of said surface-altering tool with respect to said table in accordance with the position of said slider on said support, said means comprising at least one rod pivoted at two points therealong and having the same direction as at least one main ray of the Fresnel surface manufactured, said ray extending from the operative edge of said surface-altering tool, said two points being spaced apart a distance equal to the distance from the optical axis of the Fresnel surface to the surface under the tool measured along the main ray, said pivot for said surface-altering tool being located thereon closely adjacent said operative edge thereof, one of said two pivot points for said rod being mounted on said slider and the other of said two pivot points being located in the optical axis of the Fresnel surface, said means further comprising two rods which are both mounted at one end thereof, respectively, on a pivot point in turn slidably mounted on said tool, and the other extremities of said two rods being pivoted one on said first-named rod and the other on said slider, respectively, said last pivot points being equidistant from said slidably mounted pivot point in one direction and being equidistant from said tool pivot point in the other direction, said slider mounted rod pivot and said tool pivot being located in a line normal to said table.

6. A device for forming Fresnel surfaces, comprising; a table adapted to support an object in which the Fresnel surface is to be formed, a support detached from said table but operatively associated therewith, a slider movably mounted on said support, a surface-altering tool pivotally mounted on said slider for movement therewith, and means for regularly varying the pivotal position of said surface-altering tool with respect to said table in accordance with the position of said slider on said support, said means comprising at least one rod pivoted at two points therealong and having the same direction as at least one main ray of the Fresnel surface manufactured, said ray extending from the operative edge of said surface-altering tool, said two points being spaced apart a distance equal to the distance from the optical axis of the Fresnel surface to the surface under the tool measured along the main ray, said pivot for said surface-altering tool being located thereon closely adjacent said operative edge thereof, one of said two pivot points for said rod being mounted on said slider and the other of said two pivot points being located in the optical axis of the Fresnel surface, said tool and said rod being coincident.

7. A device for forming Fresnel surfaces, comprising: a table adapted to support an object in which the Fresnel surface is to be formed, a support detached from said table but operatively associated therewith, a slider movably mounted on said support, a surface-altering tool pivotally mounted on said slider for movement therewith, and means for regularly varying the pivotal position of said surface-altering tool with respect to said table in accordance with the position of said slider on said support, said means comprising at least one rod pivoted at two points therealong and having the same direction as at least one main ray of the Fresnel surface manufactured, said ray extending from the operative edge of said surface altering tool, said two points being spaced apart a distance equal to the distance from the optical axis of the Fresnel surface to the surface under the tool measured along the main ray, and a second surface-altering tool pivotally mounted on said slider for movement therewith, the pivot points for said first and second tools coinciding, and means pivoted at a fixed point in the optical axis of the Fresnel surface for directing the operative edges of said second tool.

8. A device for forming Fresnel surfaces, comprising; a table adapted to support an object in which the Fresnel surface is to be formed, a support detached from said table but operatively associated therewith, a slider movably mounted on said support, a surface-altering tool pivotally mounted on said slider for movement therewith, and means for regularly varying the pivotal position of said surface-altering tool with respect to said table in accordance with the position of said slider on said support, said means comprising at least one rod pivoted at two points therealong and having the same direction as at least one main ray of the Fresnel surface manufactured, said ray extending from the operative edge of said surface altering tool, said two points being spaced apart a distance equal to the distance from the optical axis of the Fresnel surface to the surface under the tool measured along the main ray, the axis of said tool pivot being at an acute angle to said table and passing through the operative surface of said tool.

GERRIT JAN SIEZEN.

REFERENCES CITED

The following references are of record in the file of this patent:

UNITED STATES PATENTS

| Number | Name | Date |
|---|---|---|
| 1,325,789 | Johnsson | Dec. 23, 1919 |
| 2,200,646 | Strong et al. | May 14, 1940 |
| 2,279,555 | Browne et al. | Apr. 14, 1942 |

FOREIGN PATENTS

| Number | Country | Date |
|---|---|---|
| 854,349 | France | Jan. 15, 1940 |